March 22, 1960  B. MORRISON  2,929,410
METHOD AND APPARATUS FOR PLUGGING PIPE LINES
Filed May 29, 1958  3 Sheets-Sheet 1

BILL MORRISON
INVENTOR

ATTORNEY

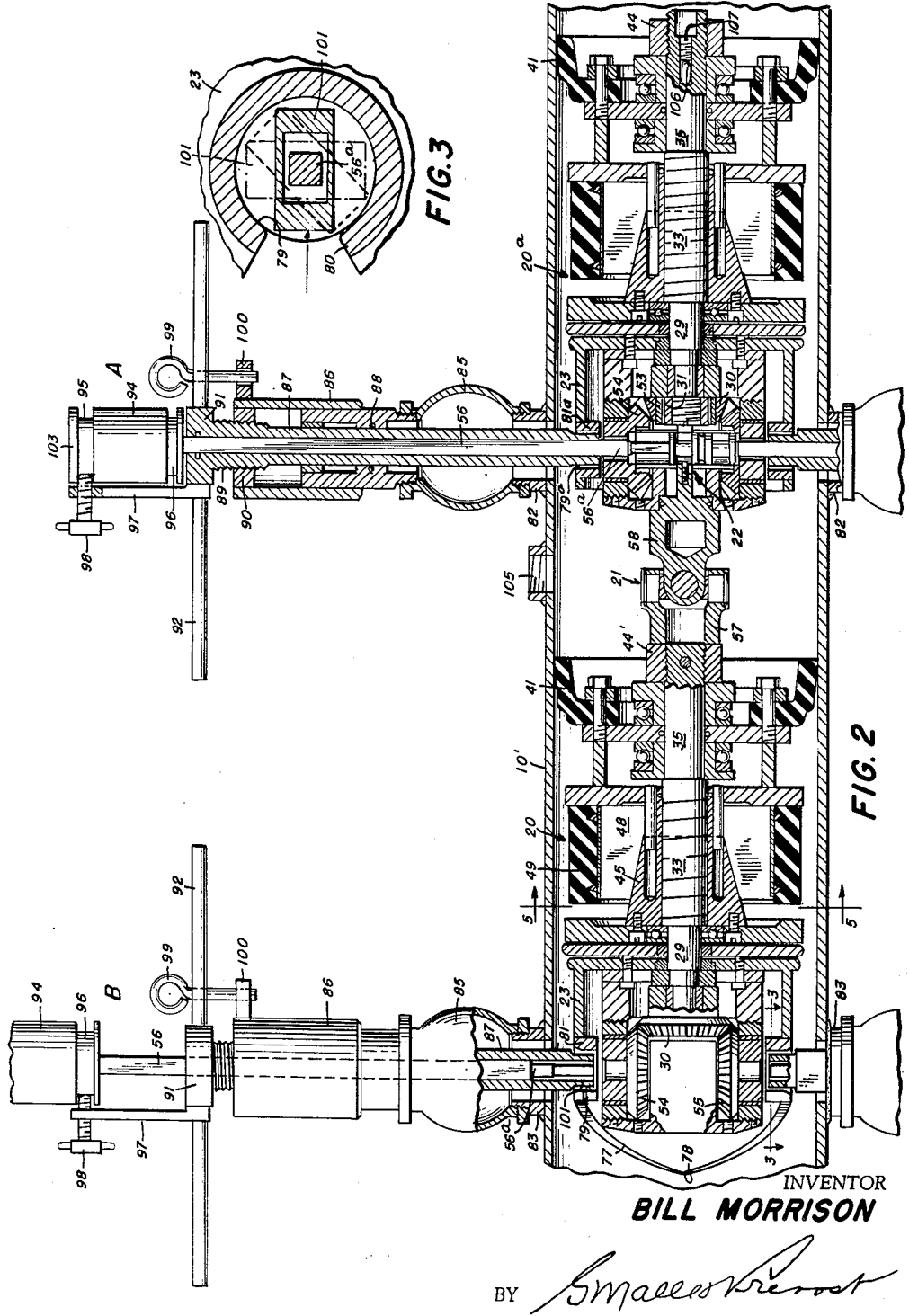

INVENTOR
*BILL MORRISON*

United States Patent Office 2,929,410
Patented Mar. 22, 1960

2,929,410

METHOD AND APPARATUS FOR PLUGGING PIPE LINES

Bill Morrison, Tulsa, Okla.

Application May 29, 1958, Serial No. 738,734

9 Claims. (Cl. 138—97)

This invention relates to a method and apparatus for plugging fluid pipe lines at predetermined longitudinally spaced points, preparatory to making repairs or altering existing installations, so as to isolate a selected length of the pipe line and simultaneously evacuate the fluid content of the pipe line from the section to be isolated. The method and apparatus of the invention may also be used in testing new pipe line installations.

More particularly, the invention consists in new and useful improvements in a method and apparatus for evacuating and isolating a section of pipe line by the use of two internally transportable plugging units arranged in a temporarily connected pair, means being provided for initially stopping the pair and locating one plugging unit at the upstream terminus of the section to be isolated, the second plugging unit of said pair being releasable by the operator and transportable internally to the downstream terminus of the section to be isolated, where it is stopped and operatively located, the evacuation of the isolated section being accomplished by the second plugging unit during the course of its travel through the section to be isolated.

Heretofore, various types of pipe line plugging devices have been developed but have proven unsatisfactory either because of difficulties in installation or their inadequacy to meet the real requirements of such an operation. One of the most serious difficulties encountered in the repairing or alteration of pipe lines and one which has not been successfully overcome with methods and apparatus heretofore designed, has been the displacing of the fluid or gas in the section of pipe line to be replaced or repaired. In order to perform any type of repair work on an existing section of pipe line, it is necessary that the fluid in such section be blocked off at both ends and drained. Ordinarily, some external method of blocking has been employed and then by some external means, the fluid or gas has been removed from the section being worked on, usually by tapping the line and storing the fluid or gas in a storage tank where it can be returned to the pipe line after completion of the repair work. This process, with equipment now available, is exceedingly costly and consumes a considerable amount of valuable line operating time because of the necessity to shut down the line while plugs are being inserted by some external attachment and then the section to be worked on must be evacuated of fluid or gas.

It is therefore the primary object of the present invention to provide a method and apparatus wherein a predetermined section of pipe line may be isolated and simultaneously evacuated by internally transported plugging and evacuating means, with a minimum of shut-down time.

Another object of the invention is to provide a pair of plugging units arranged in tandem for transportation to the area to be worked upon, said units being separable at the control of the operator for proper placement at selected intervals in the pipe line, one of said plugging units serving the added function of an evacuating device.

A further object of the invention is to provide a pair of separable plugging units arranged in tandem, including cam means associated with the lead or pilot unit for automatically stopping and adjusting the position of the plugging units at their selected locations.

A still further object of the invention is to provide a novel coupling mechanism for the tandem plugging units whereby, after one of said units has been stopped and set in position, the second unit may be released and transported to a selected remote location where it is set into position, said second plugging unit, during the course of its travel between said locations, effecting the evacuation of the section of pipe line to be worked on.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views:

Fig. 2 is a longitudinal sectional view of a portion of pipe line with the plugging apparatus of the present invention in the course of being installed;

Fig. 3 is an enlarged sectional detail taken on line 3—3 of Fig. 2, illustrating the plug locating and locking means;

Briefly stated, the method of the present invention contemplates the isolation and simultaneous evacuation of a section of pipe line to be repaired or altered and comprises introducing into a pipe line through a conventional scraper trap, an assembly including individually expansible pilot and trailing plugging units connected in tandem, internally transporting the assembly by the normal pipe line fluid pressure to a first location where it is stopped by externally actuated plug positioning and control means, expanding and sealing the trailing unit of said assembly in said pipe line to define the upstream terminus of the pipe line section to be worked on, releasing the pilot unit from the trailing unit and transporting the former by separately introduced fluid pressure, to a second location defining the downstream terminus of the section of pipe line to be worked on, the movement of said pilot unit simultaneously evacuating the fluid in the intervening pipe line area, stopping said pilot unit at said second location by externally actuated plug positioning and control means, expanding and sealing said pilot unit in said pipe line, and withdrawing the separately introduced fluid employed in transporting the pilot unit to its destination.

Figure 1:
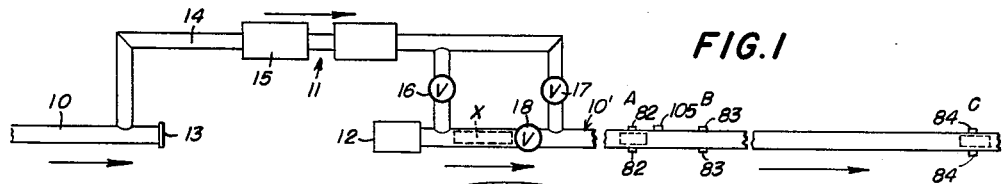
Fig. 1 is a diagrammatic view illustrating a section of conventional pipe line and showing the usual pumping station and scraper trap by means of which the plugging units of the present invention are introduced into the pipe line.

Referring first to Fig. 1 of the drawings, 10 represents a conventional pipe line for oil, gas or other fluid which is provided at predetermined intervals, usually many miles apart, with a pumping station 11 where the actual pipe line is separated to accommodate a conventional scraper trap 12. The terminus of the upstream portion of the pipe line 10 is plugged as at 13 and the scraper trap 12 is fitted into the adjacent terminus of the downstream portion 10' of the pipe line, the two portions of pipe line 10, 10' being connected by a by-pass line 14 including the usual pumps 15 and valved connections 16 and 17 which are connected into the portion 10' of the pipe line at longitudinally spaced intervals on either side of a control valve 18 in pipe line 10'.

At this point it may be noted that in the normal operation of a pipe line of this type, with the flow of fluid in the direction of the arrows shown in Fig. 1, fluid from pipe line 10 flows through by-pass line 14 and with valves 16 and 18 closed, and valve 17 open, it travels through valved connection 17 into the portion 10' where it continues through the pipe line. When it is desired to introduce a scraping device, said device is inserted through trap 12 into the section of line 10' anterior to the closed valve 18, after which the valve 17 is closed and valve 16 is opened. This causes fluid to enter line 10' behind the scraping device which, when valve 18 is subsequently opened, flows through the downstream portion of pipe line 10' to the next scraper trap where it is removed by a reversal of the procedure just described.

As will later appear, it is through this same conventional pumping station and scraper trap that the plugging units of the present invention are introduced into the pipe line. In Fig. 1, the section of pipe line 10' which is to be isolated for purposes of repair or alteration and the sequential points of location of the plugging units in the course of installation, are identified by the letters A, B and C. A defines the upstream terminus and C the downstream terminus of the section to be isolated and B defines the initial location of the tandem plugging units, all as hereinafter described.

As seen in Fig. 2 of the drawings, the plugging assembly comprising the present invention consists of two separable plugging units 20 and 20a, connected in tandem by a universal coupling 21, the latter being carried by the pilot unit 20 and detachably connected from the trailing unit 20a by a separable connection 22 to be later described in detail. In substantially all essential details, the plugging units 20 and 20a are identical and will be best understood by reference to enlarged Fig. 4 which specifically illustrates the trailing unit 20a.

Each of the plugging units comprises an annular body 23 closed at its rear end by an end wall 24 and open at its forward end to receive a gear case 25 which is bolted to the end wall 24 as at 26. A wedge mounting plate 27 and an intervening rub plate 28 are coaxially supported adjacent the end wall 24 by a central longitudinally extending shaft 29 projecting through aligned openings in the end wall 24, the rub plate 28 and the wedge mounting plate 27, said shaft carrying at its inner end a bevel gear 30, which, together with the shaft, is retained in place by a lock nut 31 screwed on the end of the shaft 29. The intermediate portion of the shaft 29 is enlarged to provide a shoulder 32 which abuts the rear face of the wedge mounting plate 27 and cooperates with the lock nut 31 in retaining the assembly in place. The enlarged portion of the shaft 29 is screw threaded as at 33 to engage complementary threads on a wedge assembly 34 to be later described and its rear end is reduced as at 35 where it engages forward and rearward thrust bearing adaptors 36 and 37 respectively, carrying thrust bearings 36' and 37'. A push cup plate 38 fits coaxially on the reduced portion 35 of shaft 29 with a spider 39 interposed between a pressure plate 40 of the wedge assembly 34. A push cup 41 of conventional design, is secured to the rear face of the cup plate 38 by means of bolts 42 and an annular retaining plate 43, the entire assembly being locked on the shaft 29 by means of an adjusting nut 44 which engages complementary threads on the ends of the reduced portion 35 of shaft 29.

Returning now to the wedge assembly 34, a wedge proper 45 in the form of a horizontally disposed, truncated pyramid, is secured to the wedge supporting plate 27 by bolts 46. The wedge 45 is centrally drilled and internally threaded as at 47 to operatively engage the threaded portion 33 of the shaft 29 and there is sufficient clearance between the converging end of the wedge 45 and the pressure plate 40 to permit the wedge to move longitudinally of the shaft upon rotation of the latter.

Spaced around the wedge 45 are a plurality of wedge shoes 48 each of which is provided with an inner wedge face, complementary to the adjacent wedge face of the wedge proper 45, the outer peripheries of the wedge shoes 48 being parti-circular to coincide with the adjacent inner periphery of a cylindrical expansion ring 49 of rubber or other suitable material. The normal, retracted diameter of the expansion ring 49 is sufficiently smaller than the inner diameter of the pipe line 10' to provide a suitable clearance between the two for purposes of transportation as will later appear, but when expanded by the cooperative action of the wedge 45 and wedge shoes 48, the expansion ring 49 is adapted to firmly engage the inner periphery of the pipe line 10' to effectively seal the latter against the passage of fluid in either direction.

Figure 5:
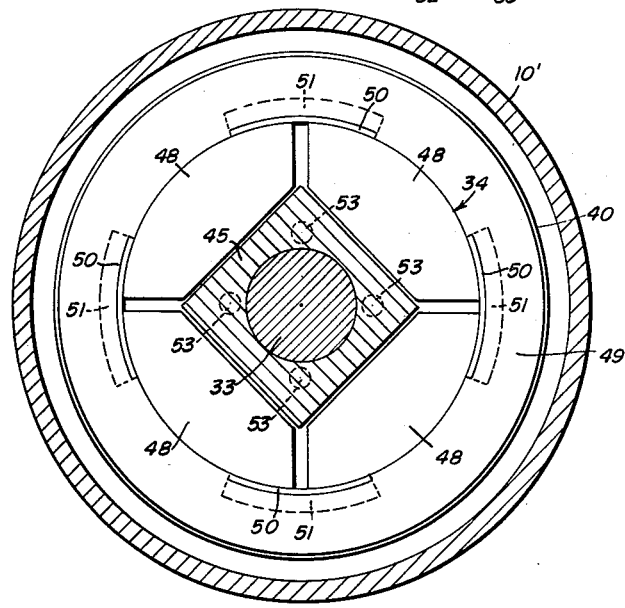
Fig. 5 is a transverse sectional view taken on line 5—5 of Fig. 2 or 4, illustrating the means for expanding the plug sealing ring.

In order to compensate for the annular separation of the respective wedge shoes 48 during the wedging action, and to maintain an even radial pressure on the inner periphery of the expansion ring 49, I preferably provide bridging members 50 which overlie the spaces between the respective wedge shoes. These bridges 50 are preferably anchored as at 51 in the expansion ring 49 and sufficiently overlie the adjacent extremities of the wedge shoes to accommodate the required relative movement of the latter, as shown in Fig. 5. Also, in order to prevent relative rotation between the wedge proper 45 and the pressure plate 40, the latter is provided with inwardly projecting pins 52 which slidably engage complementary openings 53 drilled inwardly from the converging extremity of the wedge proper 45.

Figure 4:
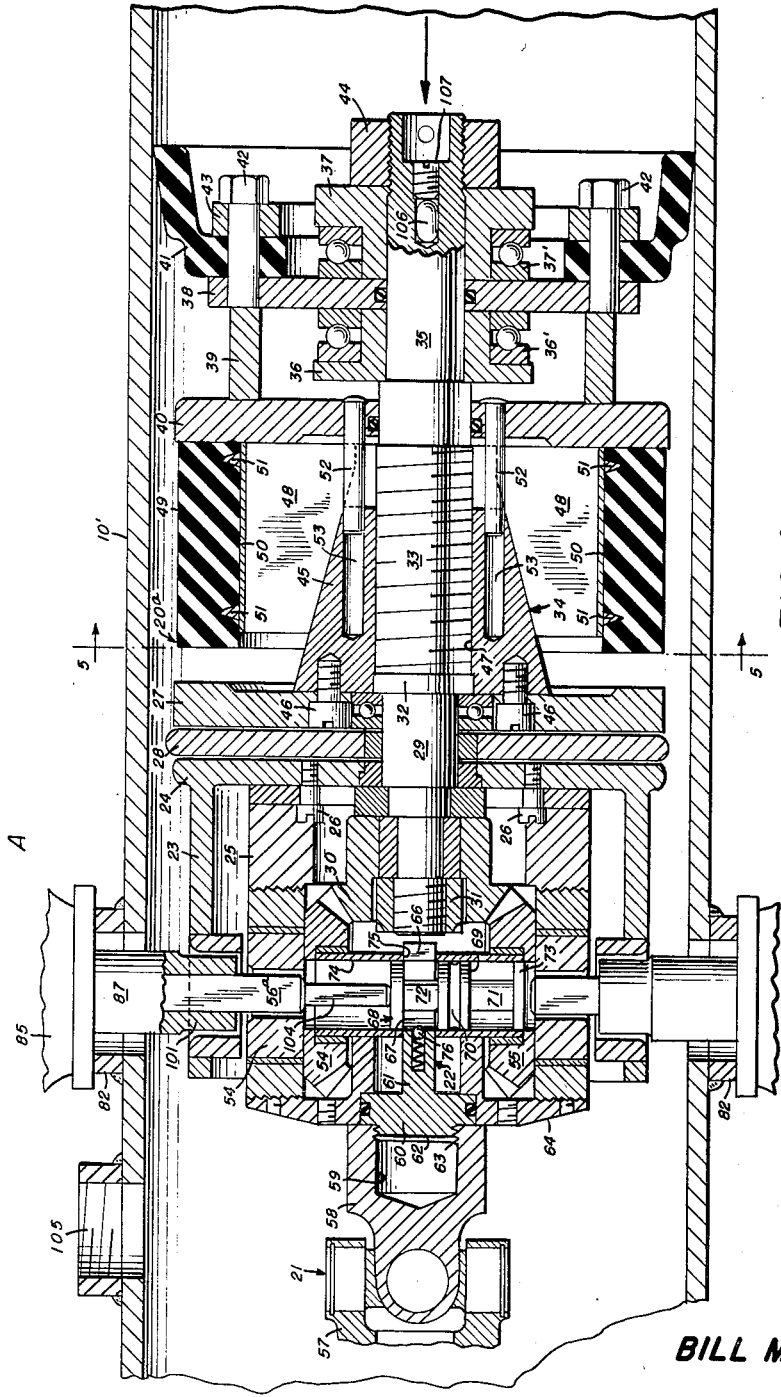
Fig. 4 is an enlarged longitudinal sectional view of the trailing plugging unit of the pair and in most essential details illustrates also the structure of the pilot or lead unit.

As previously stated, the rotation of the shaft 29 is brought about by the operation of the pinion gear 30 in the gear case 25. The gear 30 in turn, is actuated by either of the complementary pinion gears 54 or 55 which are coaxially supported for rotation in the gear case 25 at right angles to the first mentioned pinion gear 30 as shown in Fig. 4, the operation of a selected gear 54, 55 being controlled by a gear control shaft 56 having a squared portion 56a which engages a complementary squared opening disposed axially in each of the gears 54, 55. As will later appear, the gear control shaft 56 is projected from the exterior of the pipe line 10', into engagement with the selected gear 54, 55.

Turning now to Fig. 2, it will be seen that the construction and operation of the pilot plugging unit 20 and the trailing unit 20a, just described, are substantially identical and that the two are connected in tandem by the universal coupling 21. The coupling 21 is of conventional design and includes two universally connected elements 57 and 58. In the form of the invention illustrated, the forward element 57 is rigidly connected as by welding to the nut 44' which is screwed on to the reduced end 35 of the shaft 29 of the pilot plugging unit 20, the trailing coupling element 58 being designed for connection to the trailing plugging unit 20a.

As best seen in Fig. 4, the coupling element 58 is provided with a central cylindrical recess 59, open at its rear end to accommodate the head 60 at one end of the connecting link 61. Preferably the head 60 is reduced as at 62 and threaded as at 63 to engage complementary threads in the recess 59. The head 60 fits within a complementary opening arranged coaxially in the end closure plate 64 of the gear case 25 and the connecting link 61 projects into the gear casing in a longitudinal plane concentric with the shaft 29, where it terminates in a bifurcated end 65 (Fig. 6) having a throat 66 opening into a spool receiving annular recess 67 of a diameter greater than the dimensions across the throat 66 for the purpose hereinafter explained.

Figure 6:
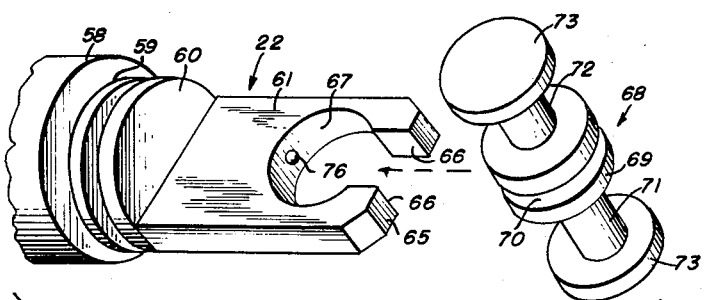
Fig. 6 is an exploded perspective view illustrating the separable connection between the leading and trailing plugging units.

Coacting with the link 61 is a floating connecting and disconnecting spool generally indicated by the numeral 68 which as seen in Fig. 6, consists of a central cylindrical portion 69 having an annular groove 70 in its periphery, a reduced shank portion 71 and 72 being provided on either side of the central portion 69, each of which terminates in an enlarged end portion 73. Returning to Fig. 4, it will be seen that the spool 68 is arranged for longitudinal sliding movement in a housing 74 supported in the gear case 25 in coaxial relation to the aligned pinion gears 54, 55, a central transverse opening 75 being provided in the housing 74 to accommodate the link 61 of the connecting assembly.

It is to be noted that the diameter of the annular recess 67 in the link 61 is such as to slidably receive the central portion 69 of the spool 68 as the latter is shifted axially in the housing 74 as viewed in Fig. 4. However, the distance across the throat 66 of the link 61, while sufficient to freely receive the reduced portions 71 and 72 of the spool, is insufficient to permit the lateral passage of the enlarged portion 69 therethrough. Thus, when the spool is shifted to a position where the enlarged portion 69 rests within the recess 67, relative longitudinal movement of the plugging units 20 and 20a is prevented by engagement of the boundaries of the recess 67 with the enlarged portion 69 of the spool. In order to facilitate the maintenance of this engagement, a poppet ball and spring arrangement 76 is provided in the link recess 67 which coacts with the annular groove 70 in the enlarged portion 69 of the spool, to prevent accidental displacement.

It will be apparent that a shifting of the spool 68 in either axial direction when the enlarged portion 69 is located within the recess 67, will cause the alignment of either of the reduced portion 71 or 72 with the throat 66 to permit the detachment of the link upon relative longitudinal movement of the pilot plugging unit 20 with respect to the trailing unit 20a, all as hereinafter explained in the operation of this device.

Figure 7:
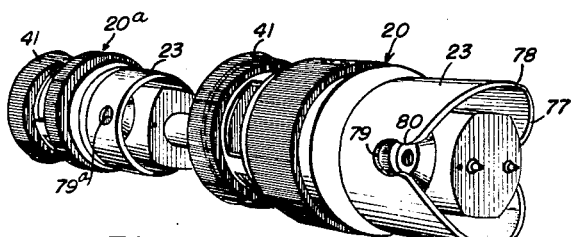
Fig. 7 is a perspective detail of the plugging assembly, especially illustrating the camming nose on the pilot or leading plug unit.

The essential structural differences between the pilot plugging unit 20 and the trailing unit 20a reside in the fact that the pilot unit as seen in Figs. 2 and 7, has a body portion 23 which terminates at its forward end in a double cam edge or nose 77 which as will later appear, is designed to engage certain previously installed elements which project inwardly from the exterior of the pipe line 10' to automatically stop and adjust the position of the pilot unit within the pipe line. The cam surfaces 77 respectively recede from an apex 78 and terminate on opposite sides of the body 23 in guide recesses 79, having restricted throats 80. Preferably as shown in Fig. 2, the recesses 79 are provided with open guide bushings 81.

As distinguished from the pilot unit 20, the trailing unit 20a has no cam nose and the openings 79a in the body 23 are closed and provided with closed guide bushings 81a. Certain additional structural features and parts will be described in the following explanation of the method of installation and operation of the invention.

As previously noted, Fig. 1 shows at A and C the ultimate locations of the plugging devices for isolating the intervening section of pipe line for purposes of repair or alteration. In preparation for this plugging operation, nipples such as 82 are first welded on opposite sides of the pipe line 10' at location A where, for example, the section of pipe line is to be replaced or repaired. Likewise, nipples 83 are welded on the periphery of the pipe line at location B and nipples 84 at location C, said nipples preferably being located in longitudinal alignment on the upper and lower portions of the pipe line periphery. The nipples 83 are spaced longitudinally from the nipples 82, a predetermined distance, in the embodiment of the invention here involved, such distance being 20 inches although this may vary with different sizes of equipment.

Gate valves 85 are first screwed on to the respective nipples at locations A and B and a conventional tapping machine is attached to each of the gate valves for drilling holes in the pipe line at their respective locations. After the holes are drilled, the drill is removed far enough to allow the gate valves to be closed at locations A and B after which the tapping machine is removed.

Control shaft housings 86 are screwed into the outer ends of each of the gate valves 85 as best seen in Fig. 2 at location A, said housings being longitudinally drilled to receive hollow positioning shafts 87, O-rings 88 being provided to seal the outer peripheries of the positioning shafts 87 with respect to the central openings of the housings 86. Adjacent the upper end of each positioning shaft 87 a threaded portion 89 engages complementary threads in a support 90 and the upper end of each shaft terminates in a head 91 adapted to carry a handle member 92 whereby, upon rotation of the shaft 87 by the handle 92, said shaft may be projected and retracted with respect to the periphery of the pipe line 10', through the opening bounded by the nipples 82.

Within each positioning shaft 87 is a vertically slidable gear control shaft 56, previously referred to, terminating at its upper end in an enlarged cylindrical head 94 which is provided adjacent its upper and lower extremities with peripheral grooves or recesses 95 and 96. A bracket 97 is secured to the positioning shaft head 91 and projects vertically therefrom, its upper extremity being provided with a transverse thumb screw 98. The inner end of the thumb screw 98 projecting through the bracket 97 is adapted to engage either of the grooves 95 or 96 depending upon the vertical position desired for the shaft 56, thus retaining the shaft in a selected position which determines the extent of the projection of the shaft 56 within the pipe line 10'. Likewise, the rotation of the handle 92 and the engagement of the threads 89 with the support 90 determines the extent of projection of the positioning shaft 87 within the pipe line.

In order to set the selected position of the shaft 87, the handle 92 is provided with an opening to receive a retainer pin 99, the lower end of which is adapted to engage an opening in a fixed bracket 100 carried by the housing 86.

The inner end of each positioning shaft 87 is preferably flattened or reduced in one direction as at 101 so that its reduced area can be accommodated by the throat 80 of the recess 79 in the body portion 23 of the pilot unit 20. Thus, with the shaft 87 turned so that its flattened end 101 is in the position shown in full lines in Fig. 3, said end may readily enter the recess 79 but when turned at right angles as shown in dotted lines it is locked in position.

After installation of the control shaft assembly in the valves 85 at locations A and B, the valves at location A are opened and the ends of the positioning shafts 87 are positioned flush with the inside wall of the pipe line 10' by adjusting the vertical position of the shaft through rotation of the handle 92. The handle is then locked in the proper position by the retainer pin 99. Next, the ends of the positioning shafts 87 at position B are adjusted to extend a predetermined distance inside the pipe lines inner periphery to rest in line for ultimate engagement by the nose cam 77 of the pilot unit 20. The handle 92 at position B is positioned in the same horizontal plane as the pipe line diameter and held in this position by the retainer pins 99. This positions the flattened ends 101 of the positioning shafts 87 at location B with the reduced areas aligned for entry through the throats 80 into the recesses 79 in the body 23, as will later appear.

Depending upon the length of the section of pipe line being replaced or repaired, position C can be any number of feet from the control location B and the process of installing the valves and positioning shafts at location C is substantially the same as that just described in connection with the installations at positions A and B.

Now, with the positioning shafts and gear control shafts installed as just described, the pilot plugging unit 20 is placed in the scraper trap 12 (Fig. 1) upstream from the positioning shafts of position A. The trailing unit 20a is then connected in tandem to the pilot unit by the universal coupling 21 and the connecting link and spool 22, 68 where it is held in locked position by the poppet ball 76 in groove 70. At this point, valves 16 and 18 have been in closed position with the fluid flowing through the pipe line through by-pass line 14 and valved connection 17. Valve 17 is now closed and valves 16 and 18 opened whereupon, fluid pressure is introduced behind the tandem plugging assembly shown in dotted lines at X in Fig. 1 which causes its internal transportation with the fluid through the pipe line section 10'.

When the nose 77 of the pilot unit reaches position B, its cam surfaces engage the projecting ends of positioning shafts 87 and regardless of the position of the plugging units at the time, cause the pilot unit to rotate until the flattened ends 101 of the positioning shafts 87 enter the throats 80 and recesses 79 in the body 23 of the pilot unit. The forward movement of the tandem assembly is thus halted and the initial position of the pilot unit established. It is to be noted that this transportation is effected through the medium of the push cups 41 and when the tandem assembly approaches the positioning shafts of locations A and B, the pumping station reduces the through flow of fluid or gas to a minimum to avoid unnecessary shock when the tandem unit is stopped by the positioning shafts.

The body 23 of the pilot unit 20 is free to rotate on shaft 29 separately from the remainder of the unit, the purpose being to align the body 23 of the pilot unit with the positioning shafts 87 through the action of the cam nose 77. Retainer pin 99 is then removed to allow the positioning shafts 87 at location B to be screwed into tight engagement in the recesses 79 against the body 23, the length of the positioning shafts and the screw threads 89 being such that a predetermined number of turns of the handle 92 properly locks the body 23 in position where it is retained by the retainer pins 99.

The thumb screws 98 are then removed from the lower groove 96 of the head at location B which has held the gear control shaft 56 in its uppermost position. The gear control shafts 56 are thereby permitted to move toward the axis of the plugging assembly with their squared portions 56a in engagement with the gears 54 and 55 respectively at which point the thumb screws 89 are reset in engagement with the upper annular grooves 95 to lock the same in engagement with the gears just referred to. Socket wrenches are used to turn the gear control shafts 56 by insertion in the squared openings 103 at the upper ends of the heads 94. When the gear control shaft 56 at location B is turned in counterclockwise direction, the gear 54 likewise turns in counterclockwise direction which turns the gear 30 on shaft 29 in clockwise direction. The shaft 29 being connected to the trailing unit 20a rotates the body 23 thereof at location A to bring the recesses 79 in said last-named body 23 in position for receiving the positioning shafts 87 at location A. When in proper alignment, the positioning shafts 87 at location A are screwed inwardly by means of the handle 92 until their ends tightly engage the boundaries of the recesses 79 to lock the trailing unit 20a in position.

The gear control shaft 56 at location A is then screwed inwardly until its squared portion 56a engages the corresponding squared opening of gear 54, the shaft being locked in this engaging position by the thumb screw 98 located in the annular groove 95. Rotation of the gear control shaft 56 in counterclockwise direction correspondingly rotates the gear 54 which in turn rotates the gear 30 in clockwise direction causing the shaft 29 to rotate in the same direction. The rotation of the shaft 29 and its threaded portion 33 causes the wedge 45 to move along the shaft into wedging action with the wedge shoes 48, thereby expanding the sealing ring 49 into sealing engagement with the inner periphery of the pipe line 10' and consequently locking the trailing unit 20a in place to plug the pipe line at that point.

Simultaneously with the inward movement of the gear control shaft 56 into operative engagement with the gear 54, a projection 104 on the end of the shaft has abutted the adjacent end 73 of the floating spool 68, disengaging the link 61 from the enlarged portion 69 of the spool and presenting the reduced portion 72 in the path of the throat 66 of the link.

By means of an inlet collar 105 (Figs. 1 and 2) connected into the pipe line 10', any suitable fluid pressure such as gas pressure may be introduced into the pipe line between the sealed trailing unit 20a and the pilot unit 20 which is now free for movement away from the trailing unit. The withdrawal of the positioning shaft 87 at location B and with it the gear control shaft 56a, permits the transportation of the pilot unit 20 under the force of said fluid pressure behind the push-cup 41, longitudinally through the pipe line until its nose 77, 78 engages the corresponding positioning shaft 87 at location C which marks the opposite extremity of the section of pipe line to be repaired. Here, by the cam action of the nose of the pilot unit in connection with the end of the positioning shaft 87, the pilot unit 20 is automatically positioned for ultimate sealing. The handle 92 is rotated in clockwise direction bringing the ends of the positioning shafts 87 in tight engagement in the recesses 79 of the body 23 as heretofore described and by manipulation of the gear control shaft 56, through the action of the gears 54, 55 and 30, a wedging action is effected between the wedge 45 and the wedge shoes 48 to cause a sealing of the ring 49 against the inner periphery of the pipe line 10'. It is to be noted that the individual operation of each of the units 20 and 20a at their sequential locations, is the same as that previously described in connection with the trailing unit 20a.

During the course of its travel from location B to point C, the pilot unit 20 evacuates the fluid in the section of pipe line to be repaired, thus obviating the necessity of external withdrawal of the fluid from said pipe line. After the pilot unit is locked in place the fluid or gas used in propelling the same from location B to location C is bled off at the inlet collar 105 and the section of pipe can be replaced or repaired or other alterations made at this point.

After the pipe line is welded and cooled, the plugging units 20 and 20a are released by reversing the wedging action heretofore described, allowing the normal flow of fluid or gas in the pipe line past the units to equalize the pressure on both sides of the units. All positioning shafts are removed from the housings 86 during which process all of the gate valves 85 are closed. The pumping station now starts the through flow and full operation of the pipe line again with the result that both units 20 and 20a will be transported downstream to the next scraper trap where they are removed from the pipe line.

All control shaft housings are removed from the gate valves, and shafts containing threaded plugs are inserted through each control shaft housing. The housings are then screwed back into the valves and the gate valves are opend so as to permit the insertion of the shafts containing the threaded plugs to seal the pipe line at the nipple openings. The gate valves 85 are then removed by sliding over the plug carrying shafts.

In order to notify the operator when the pilot unit is approaching location A or B, the end of the shaft 29 of the trailing unit 20a may be provided with a capsule 106 containing cobalt which is held in place by a plug 107. The capsule is detected as it approaches location A or B by a Geiger counter held close to the pipe line. As a precautionary measure, it is well to know at all times From the foregoing, it is believed that my invention may be readily understood by those skilled in the art without further description, it being borne in mind that numerous changes may be made in the details disclosed without departing from the spirit of the invention as set forth in the following claims.

I claim:

1. In a pipe line plugging apparatus, a plugging unit comprising an annular body adapted to be coaxially inserted in a pipe line, a push cup on said body responsive to the fluid pressure in said pipe line for internally transporting the unit through the pipe line, at least one externally controlled positioning assembly selectively projectible radially into said pipe line, means on said body engageable with said assembly for locking said unit in a selected position in said pipe line, a cam nose on the leading end of said body engageable with said positioning assembly for rotating said body to align the locking means therein with said positioning assembly, a concentric shaft extending horizontally through said body, threads on a portion of said shaft, an internally threaded wedge member operatively engaging said threaded portion for longitudinal movement on said shaft, an expansible sealing ring operable by said wedge member, gear mechanism in said body for rotating said shaft, and externally controlled means carried by said positioning assembly, for actuating said gear mechanism.

2. In a pipe line plugging assembly including a pair of internally transportable plugging units slidably engageable with the inner periphery of a pipe line, means for detachably connecting said units in tandem, comprising a link carried coaxially by one unit, one end of said link being bifurcated to form an annular recess having a restricted throat, shiftable lock means carried by the other unit, selectively engageable with said link to lock the two units together, said lock means comprising a floating spool shiftable axially of said annular recess, said spool having a central portion of a diameter to provide a sliding fit in said recess, reduced portions on either side of said central portion of a diameter to be accommodated by said restricted throat, and means controlled externally of said pipe line for longitudinally shifting said floating spool to selectively position the same with respect to said restricted throat for engaging or disengaging said link.

3. A plugging assembly as claimed in claim 2, including means for normally maintaining the engagement of the central portion of said spool with said annular recess.

4. The method of isolating and simultaneously evacuating a section of pipe line, comprising utilizing the normal fluid pressure in a pipe line for internally transporting a pair of juxtaposed plugging devices, stopping said pair at a predetermined location in the pipe line by inserting an abutment in the path of the leading device, expanding and sealing the trailing device to define the upstream terminus of the section of pipe line to be worked on, releasing said abutment, introducing fluid pressure from a separate source behind the leading device to thereby continue its transportation to a second location while displacing therewith, the anterior pipe line fluid, expanding and sealing said leading device to define the second terminus of the section of pipe to be worked on, and releasing the separate fluid pressure from said section.

5. The method of isolating and simultaneously evacuating a section of pipe line, comprising utilizing the normal fluid pressure in a pipe line for internally transporting a pair of plugging devices connected in tandem, stopping said pair at a predetermined location in said pipe line, expanding and sealing the trailing device by externally controlled means, to define the upstream terminus of the section of pipe line to be worked on, releasing the leading device from the trailing device, introducing fluid pressure from a separate source behind the leading device to thereby continue its transportation to a second location while displacing therewith, the anterior pipe line fluid, expanding and sealing by external means, said leading device to define the second terminus of the section of pipe line to be worked on, and releasing the separate fluid pressure in said section.

6. The method as claimed in claim 5, including the step of temporarily reducing the flow in said pipe line as the pair of plugging devices approaches said first predetermined location.

7. A method of isolating and evacuating a section of pipe line, comprising installing gate valves in the periphery of a pipe line at the upstream and downstream termini of the section of pipe line to be worked on, installing a third gate valve in said pipe line at a predetermined point relatively close to the gate valve installed at the upstream terminus of said section, introducing through said downstream gate valve and said third gate valve, externally controlled stop and locking means and through said upstream gate valve, externally controlled locking means, all of said means being selectively projectible and retractible from said pipe line, utilizing the normal fluid pressure in said pipe line for internally transporting a pair of juxtaposed plugging devices, stopping said pair by projecting the stop means through said third gate valve to locate the trailing plugging device at the upstream terminus of said pipe section, projecting the locking means into engagement with said trailing device through the corresponding gate valve to lock said trailing device in place, expanding and sealing said trailing device, introducing fluid pressure from a separate source behind the leading device to thereby continue its transportation to the downstream terminus of said pipe section while displacing therewith, the anterior pipe line fluid, projecting the stop means through said downstream gate valve to stop said leading device, locking and expanding and sealing said leading device, and releasing the separate fluid pressure from said section.

8. In a pipe line plugging apparatus, a plugging unit comprising an annular body adapted to be coaxially inserted in a pipe line, a push cup on said body responsive to the fluid pressure in said pipe line for internally transporting the unit through the pipe line, at least one externally controlled positioning member selectively projectible radially into said pipe line, locking means on said body engageable with said member for securing said unit in a selected position in said pipe line, a cam nose on the leading end of said body engageable with said positioning member for rotating said body to align the locking means therein with said positioning member, an expansible element concentrically arranged on said unit for sealing the interior of said pipe line, and externally controlled means for expanding said element.

9. A pipe line plugging unit as claimed in claim 8, wherein said cam nose is provided with multiple cam surfaces respectively directed from a leading edge to common locking means on said body, whereby said body may be rotated in either direction to effect engagement of said positioning member with said locking means.

References Cited in the file of this patent

UNITED STATES PATENTS

| | | |
|---|---|---|
| 888,146 | Deasy | May 19, 1908 |
| 1,296,042 | Bralore | Mar. 4, 1919 |
| 1,966,819 | Irvin | July 17, 1934 |
| 2,772,441 | Riser | Dec. 4, 1956 |
| 2,786,489 | Morrill | Mar. 26, 1957 |
| 2,827,317 | Saulnier | Mar. 18, 1958 |